United States Patent
Crane

(10) Patent No.: US 7,944,723 B2
(45) Date of Patent: May 17, 2011

(54) MATRIX CONVERTERS

(75) Inventor: Allan David Crane, Rugby (GB)

(73) Assignee: Converteam UK Ltd, Warwickshire (GB)

( * ) Notice: Subject to any disclaimer, the term of this patent is extended or adjusted under 35 U.S.C. 154(b) by 703 days.

(21) Appl. No.: 11/792,784

(22) PCT Filed: Dec. 16, 2005

(86) PCT No.: PCT/GB2005/004907
§ 371 (c)(1),
(2), (4) Date: Apr. 1, 2008

(87) PCT Pub. No.: WO2006/064279
PCT Pub. Date: Jun. 22, 2006

(65) Prior Publication Data
US 2009/0096518 A1     Apr. 16, 2009

(30) Foreign Application Priority Data

Dec. 16, 2004  (GB) .................................. 0427626.7

(51) Int. Cl.
*H02M 7/757* (2006.01)
*H02M 7/81* (2006.01)
(52) U.S. Cl. ........... 363/127; 363/69; 363/132; 323/239
(58) Field of Classification Search ..................... 363/67, 363/69, 84, 89, 125, 127, 71, 131, 132; 323/239
See application file for complete search history.

(56) References Cited

U.S. PATENT DOCUMENTS

| | | | |
|---|---|---|---|
| 5,460,244 A | 10/1995 | Tanahashi | |
| 6,163,472 A | 12/2000 | Colby | |
| 6,166,930 A | 12/2000 | Czerwinski | |
| 6,442,051 B1 * | 8/2002 | Ryan et al. | 363/87 |
| 6,657,874 B2 | 12/2003 | Yu | |
| 6,859,374 B2 * | 2/2005 | Pollanen et al. | 363/69 |
| 7,148,660 B2 * | 12/2006 | Ghosh et al. | 323/207 |
| 2003/0090225 A1 | 5/2003 | Posma et al. | |

FOREIGN PATENT DOCUMENTS

| | | |
|---|---|---|
| CA | 1 130 482 A1 | 8/1982 |
| JP | 59238430 | 11/1984 |
| JP | 11/238185 | 8/1999 |
| JP | 2002 2298320 | 10/2002 |

OTHER PUBLICATIONS

*Two Stage Direct Power Converters: An Alternative to the Matrix Converter*, B. Klumpner, IEEE (Online) Apr. 1, 2003, pp. 7/1-7/9.
*Bi-Directional Switch Commutation for Matrix Converters*, 8th European Conference on Power Electronics and Applications, L. Empringham, et al., Lausanne, Ch., 09/07—Sep. 1999, EPE, European Conference on Power Electronics and Applications, Brussels.

* cited by examiner

*Primary Examiner* — Gary L Laxton
(74) *Attorney, Agent, or Firm* — Kirschstein et al.

(57) ABSTRACT

A matrix converter that can be used as part of a two-stage power converter has three ac three ac voltage lines AC1, AC2 and AC3 and two dc voltage lines DC1 and DC2. An array of six semiconductor switches 10a to 10f are arranged such that each of the three ac voltage lines AC1, AC2 an AC3 can be connected to one of the two dc voltage lines DC1 and DC2 when the associated switch is closed. A freewheel path is provided between the two dc voltage lines DC1 and DC2, which provides a fifth state of operation when all the switches 10a to 10f are open.

41 Claims, 11 Drawing Sheets

MATRIX CONVERTERS

FIELD OF THE INVENTION

The present invention relates to matrix converters, and in particular to matrix converters that can be used to form the first stage of a two-stage power converter, or used as a single or multi-stage power supply. The two-stage power converter can be used to interface a variable speed drive to a supply network, for example. The matrix converter can also be used to feed a dc load or to condition power that is fed back to an ac power grid or supply network.

BACKGROUND OF THE INVENTION

Matrix converters are becoming an increasingly popular way of providing direct power conversion for variable speed drives and power supplies. In its most basic form, a matrix converter consists of an array of switches that are arranged such that any of a number of input lines can be connected to any of a number of output lines in a predetermined configuration. A conventional single-stage matrix converter is shown in FIG. 1. The matrix converter has three input lines labelled I1, I2 and I3 of a three-phase ac voltage supply network, and three output lines labelled O1, O2 and O3 for supplying a three-phase ac output voltage to a load. Nine bi-directional switches S1 to S9 allow any of the input lines I1, I2 and I3 to be connected to any of the output lines O1, O2 and O3.

The switches are implemented using semiconductor devices and can be bi-directional such that the single-stage matrix converter can be used for both motoring and generating applications. A common bi-directional switch implementation uses a back to back series-connected pair of fast recovery diodes (FRDs) and a pair of Insulated Gate Bipolar Transistors (IGBTs) connected together in anti-parallel with the diodes. The IGBTs can be connected together in a common collector (FIG. 2a) or common emitter (FIG. 2b) arrangement. Other solid-state devices such as Metal Oxide Semiconductor Field Effect Transistors (MOSFETs), Integrated Gate Commutated Thyristors (IGCTs), MOS-Controlled Thyristors (MCTs) and Gate Turn Off Thyristors (GTOs) can be used in place of the IGBTs. It is sometimes also convenient to use a semiconductor device having a reverse-blocking capability such as Reverse Blocking-Insulated Gate Bipolar Transistors (RB-IGBT).

The waveform of the three-phase ac output voltage is usually created using pulse width modulation. Pulse width modulation is described in more detail below in connection with the matrix converter of the present invention, but in terms of FIG. 1, it essentially involves connecting each of the output lines O1-O3 to each of the input lines I1-I3 in a particular sequence and for preselected periods of time. The three-phase ac output voltage is therefore made up of parts of the three-phase input voltage. The switches S1-S9 are normally controlled to open and close in accordance with a particular modulation strategy.

One of the major problems with conventional matrix converters is the lack of natural freewheel paths. The operation of the switches must therefore be carefully controlled. If an output line is connected to two or more of the input lines at the same time then this will cause a short circuit and the resulting large current may cause severe damage to the matrix converter, or even destroy it. On the other hand, if an output line is not connected to any of the input lines then there is no path for the inductive current load and this will cause a large over-voltage. It will be appreciated that currently available semiconductor switches cannot be switched on and off with the necessary degree of precision and it is therefore impossible to prevent short and open circuits on the output lines of the matrix converter without using some orderly form of current commutation. One possible four-step commutation strategy is described in Dr Wheeler, P.; Dr Clare, J.; Dr Empringham, L. "Bidirectional Switch Commutation for Matrix Converters" (EPE '99-Lausanne). This problem is addressed in the matrix converter according to the present invention.

It is also possible to use a matrix converter as a rectifier to provide a dc output voltage to a load. U.S. Pat. No. 6,166,930 to Otis Elevator Company describes a matrix converter that is used to connect a three-phase ac input voltage directly to a dc elevator motor. The matrix converter has three input lines for receiving the three-phase ac input voltage and two output lines for supplying the dc output voltage to the dc field windings of the elevator motor. Six bi-directional switches implemented using IGBTs allow any of the three input lines to be connected to either of the output lines and are controlled in sequence using pulse width modulation to provide the required dc voltage waveform at the input terminals of the elevator motor. The elevator motor is used to drive a sheave to which an elevator car and counterweight are roped. The elevator motor is able to operate in a regenerating mode when the elevator car decelerates, when the elevator car is travelling up with a load that is less than the rated load, and when the elevator car is travelling down with a load that is greater than the rated load, for example. The bi-directional switches permit current to flow in either direction from ac to dc when the elevator motor is in normal operation (motoring mode), or from dc to ac in regenerating mode. The bi-directional switches also permit current to flow with either positive or negative dc voltage polarity.

Although conventional matrix converters are normally used as a single-stage power converter, they can also be used to as part of a two-stage power converter. Klumpner, C.; Blaabjerb, F. "Two stage direct power converters: an alternative to the matrix converter" (IEE Seminar, Matrix Converts, 1 Apr. 2003, Austin Court), describes with reference to FIG. 3(b) a two-stage direct power converter which consists of a matrix converter that is used as a rectification stage, and an inversion stage where an array of IGBTs and FRDs are connected together to form a voltage source inverter (VSI). A surge arrester consisting of a diode and capacitor in series extends across the dc-link of the two-stage converter. This is not a freewheel path.

SUMMARY OF THE INVENTION

The present invention provides a matrix converter comprising:
   three ac voltage lines;
   two dc voltage lines;
   a first switch connected between a first one of the three ac voltage lines and a first one of the two dc voltage lines, a second switch connected between a second one of the three ac voltage lines and the first one of the two dc voltage lines, a third switch connected between a third one of the three ac voltage lines and the first one of the two dc voltage lines, a fourth switch connected between the first one of the three ac voltage lines and a second one of the two dc voltage lines, a fifth switch connected between the second one of the three ac voltage lines and the second one of the two dc voltage lines, and a sixth switch connected between the third one of the three ac voltage lines and the second one of the two dc voltage lines, such that each of the three ac voltage lines can be connected to one of the two dc voltage lines when the associated switch is closed; and a freewheel path between the two dc voltage lines.

The matrix converter can be used as the first stage in a two-stage power converter that includes an inverter stage. The matrix converter can also be used to feed a dc load or to condition power that is fed to a power grid or supply network.

The inverter stage of the two-stage power converter is preferably a voltage source inverter (VSI) or a current source inverter. However, it will be readily appreciated that any other suitable inverter can also be used depending on the particular application. Such an inverter may also be operated as a rectifier for regeneration purposes. The power converter also preferably includes dc-link filter connected across the dc voltage lines of the matrix converter, and an ac line filter.

The two-stage power converter can be used to interface a variable speed drive to a supply network. For example, a three-phase ac input voltage of fixed frequency can be supplied to the matrix converter from the power grid or supply network. The matrix converter rectifies the three-phase ac input voltage and the resulting dc output voltage is filtered by the dc-link filter and supplied to the inverter stage. The inverter stage can then be controlled to provide an ac output voltage of variable frequency to the variable speed drive.

In another application, the matrix converter can be used to interface a variable speed generator to a power grid or supply network. The generator can be driven by a prime mover or turbine. It will be readily appreciated that the voltage and frequency of the power grid or supply network must be regulated to remain within precise limits. The matrix converter can therefore be used to convert the variable dc output voltage of the inverter responsible for generator regulation to comply with these precise limits. In this way, the matrix converter can be used to feed low distortion ac current into an existing energised supply network (energised by other power generating systems) in order to contribute power to a large power grid or supply network. Alternatively, the matrix converter can be used as the sole source of power supply to a power grid or supply network by converting the dc link power from a generator to a low distortion voltage and current power supply that complies with these precise limits. A number of such matrix converters and generators may be operated in unison to provide a high quality power supply.

It will be readily appreciated that a matrix converter which is configured only to operate in generating mode to feed dc link power from a generator into a power grid or supply network could be considered to be identical to a current source inverter. The significance of the present invention is that the matrix converter is able to regulate bi-directional power flow, whilst retaining a uni-directional dc link voltage, i.e. its dc current flow is bidirectional. The conventional current source inverter is able to regulate bi-directional power flow by allowing its dc terminal voltage to reverse, i.e. its dc current flow is uni-directional. The uni-directional dc voltage in the matrix converter according to the present invention is specifically used to permit the freewheel path to provide benefits.

In yet another application, the matrix converter can be used in the same way as described above, but with the additional benefit of being able to operate in a motoring mode. In other words, the generator can be operated as a motor powered by the power grid or supply network. The motoring capability of the matrix converter can be useful for commissioning and testing purposes where a generator must be rotating without requiring power to be supplied by a prime mover or turbine. The motoring mode can also be used to enable the generator to be used as a motor to start a prime mover or rotate a prime mover for commissioning and test purposes.

Although the matrix converter according to the present invention includes a freewheel path between the two dc voltage lines, it operates in a similar way to conventional matrix converters, in that the switches are controlled to open and close in sequence using pulse width modulation such that each of the three ac voltage lines can be connected to, and isolated from, the two dc voltage lines.

The freewheel path will preferably include a diode. However, in place of a diode the freewheel path can include a thyristor, or any other suitable reverse-blocking device, such as a Reverse Blocking-Insulated Gate Bipolar Transistor (RB-IGBT) or Reverse Blocking-Gate Turn Off Thyristor (RB-GTO), so that the freewheel path can be switched on (or enabled) at certain times during the operation of the power converter and switched off (or disabled) at other times.

The addition of the freewheel path represents a significant departure from conventional matrix converters and provides a "fifth state" in addition to the three states that are provided by connecting each of the ac voltage lines to both of the dc voltage lines in either polarity, and the fourth state that is provided by connecting both of the dc voltage lines to the same ac voltage line. In the "fifth state" all of the matrix switches are operated to be open such that the dc voltage lines are not connected to any of the ac voltage lines. Instead of causing a large over-voltage, the inductive current load is allowed to flow through the freewheel path. If the matrix converter is used for motoring applications, where the dc output voltage is pulse width modulated to a lower level, the "fifth state" may be used for a greater proportion of the time and this results in a significant reduction in dissipation and an increase in efficiency compared to conventional matrix converters because the freewheel path has lower conduction losses. Another advantage of the "fifth state" is that the pulse width modulation common mode voltage is reduced.

The first, second, third, fourth, fifth and sixth switches can be uni-directional. This enables the matrix converter to be used for either motoring applications (i.e. where a three-phase input ac voltage is supplied to the ac voltage lines) or for generating applications (i.e. where a dc input current is supplied to the dc voltage lines) but not for both at the same time. For motoring applications, the matrix converter rectifies the three-phase ac input voltage and supplies a dc output voltage to the inverter stage of the power converter. For power supply applications, the matrix converter rectifies the three-phase ac input voltage and supplies a dc output voltage to the load, via filters and other power electronic stages, as required. For generating applications, the matrix converter inverts the input dc current and supplies a three-phase ac output voltage. The matrix converter can be used for generating applications but the main benefits of the invention are only realised when the matrix converter is used for motoring and power supply applications.

The first, second, third, fourth, fifth and sixth uni-directional switches preferably include a semiconductor device. The semiconductor device may have reverse blocking capabilities such as an RB-IGBT or RB-GTO. Alternatively, the first, second, third, fourth, fifth and sixth switches can include a semiconductor switch and a diode in series. The semiconductor switch is preferably an IGBT but it will be readily appreciated that the semiconductor switch can also be any other suitable solid-state device such as a Metal Oxide Semiconductor Field Effect Transistor (MOSFET), Integrated Gate Commutated Thyristor (IGCT), MOS-Controlled Thyristor (MCT) and Gate Turn Off Thyristor (GTO), for example. When a pair of semiconductor switches is closed, current can flow from the ac voltage line associated with the first semiconductor switch to the dc positive voltage line and from the dc negative voltage line to the ac voltage line associated with the second semiconductor switch (motoring applications), or from the dc positive voltage line to the ac voltage line associated with the first semiconductor switch and from the ac voltage line associated with the second semiconductor switch to the dc negative voltage line (generating applications), depending on the polarity of the semiconductor switch and diode.

The first, second, third, fourth, fifth and sixth switches can also be bi-directional. This enables the matrix converter to be used for both motoring and generating applications depending on the circumstances. Making the first, second, third, fourth, fifth and sixth switches bi-directional also allows the dc output voltage to be of either polarity.

The first, second, third, fourth, fifth and sixth bi-directional switches preferably include pairs of semiconductor devices. Each of the switches preferably includes a back to back series-connected pair of diodes and a pair of semiconductor switches connected together in anti-parallel with the diodes. The semiconductor switches are preferably an IGBT but it will be readily appreciated that the semiconductor switches can also be any other suitable solid-state device such as a Metal Oxide Semiconductor Field Effect Transistor (MOSFET), Integrated Gate Commutated Thyristor (IGCT), MOS-Controlled Thyristor (MCT) and Gate Turn Off Thyristor (GTO), for example. The IGBTs can be connected in the so-called common emitter or common collector arrangement. When a first one of the pair of semiconductor switches is closed, current can flow from the associated ac voltage line to the associated dc voltage line through the first semiconductor switch and the diode that is connected in anti-parallel with the other semiconductor switch. Similarly, when the other semiconductor switch is closed, current can flow from the associated dc voltage line through the other semiconductor switch and the diode that is connected in anti-parallel with the first semiconductor switch.

It will be immediately apparent that bi-directional switches require twice as many semiconductor devices as uni-directional switches. However, this disadvantage is normally outweighed by the increased versatility that a matrix converter having bi-directional switches can offer. If the matrix converter is to be used predominantly (but not exclusively) for either motoring or generating applications then the current ratings of the pair of semiconductor switches and/or the pair of diodes can be asymmetrical.

The power converter may further include a switching aid network (snubber) connected between the dc voltage lines. The snubber may be of any suitable type depending on the particular application. For example, the snubber may be of the capacitor resistor type. Any switching voltage transient that is experienced across the terminals of the freewheel path is also experienced by any of the semiconductor devices that form part of the first, second, third, fourth, fifth and sixth switches. Therefore, only a single snubber is needed. This simplifies the design of the power converter and improves its efficiency.

The present invention also provides a method of power conversion using a matrix converter described above, the method comprising the steps of:
supplying a momentary sample of an ac voltage to the dc voltage lines thereby establishing a dc current; and
opening the first, second, third, fourth, fifth and sixth switches of the matrix converter so that the dc current flows through the freewheel path.

Opening the first, second, third, fourth, fifth and sixth switches places the matrix converter in the "fifth state" mentioned above. This step cannot be simply implemented in conventional matrix converters because if an output line is not connected to any of the input lines then there is no natural freewheel path for the inductive current load and this will cause a large over-voltage. In conventional matrix converters, it is common practice to employ a large and complex dc surge suppressor circuit to absorb the surge energy associated with a single pulse suppression event. It is not practical to surge arrest repetitive pulse suppression events. The addition of a freewheel path between the dc voltage lines therefore provides a solution to this problem and means that the matrix converter does not have to rely on a complicated form of current commutation.

The present invention also provides a power converter comprising:
a first matrix converter as described above; and
a second matrix converter as described above;
wherein the three ac voltage lines of the first matrix converter and the three ac voltage lines of the second matrix converter are connected together, and the two dc voltage lines of the first matrix converter and the two dc voltage lines of the second matrix converter are connected together, such that the first and second matrix converters are arranged in parallel.

The power converter preferably also includes an ac line filter connected to the ac voltage lines of the first matrix converter, and an ac line filter connected to the ac voltage lines of the second matrix converter.

A first switching aid network (snubber) can be located between the dc voltage lines of the first matrix converter and a second switching aid network (snubber) between the dc voltage lines of the second matrix converter. The snubbers can be of any suitable type depending on the particular circumstances. For example, the snubbers can be of the capacitor resistor type.

The dc voltage lines of the first matrix converter and the dc voltage lines of the second matrix converter are preferably connected to two common dc voltage lines, and the power converter preferably includes a dc-link filter connected between the common dc voltage lines.

To enable graceful degradation if one of the first and second matrix converters is damaged or malfunctions, means such as switchgear or fuses are preferably provided for selectively isolating the first and second matrix converters from each other.

It will be readily appreciated that the power converter is not limited to a first matrix converter and a second matrix converter arranged in parallel. In fact, three or more matrix converters can be arranged in parallel. Furthermore, the power converter preferably includes an inverter, which may be a current source inverter or a voltage source inverter, for example.

BRIEF DESCRIPTION OF THE DRAWINGS

Exemplary embodiments of the invention will now be described, with reference to the accompanying drawings, in which.

Figure 1:
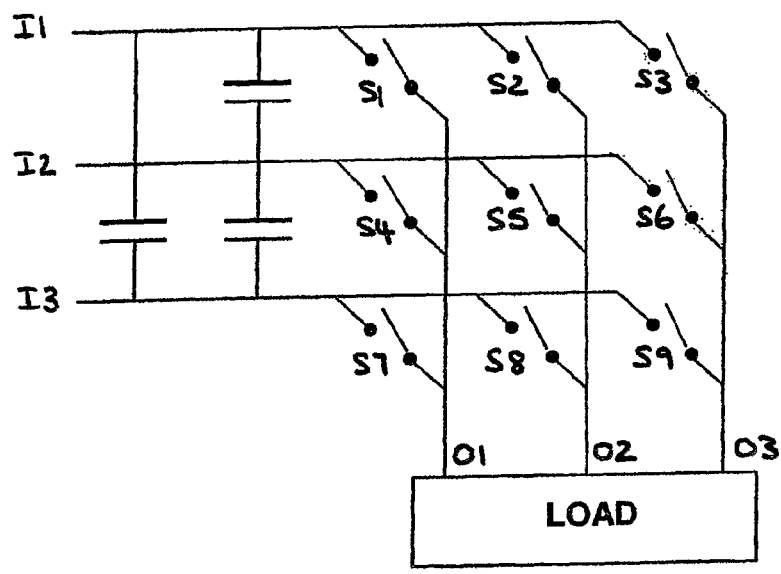
FIG. 1 is a circuit diagram showing a conventional three-phase to three-phase matrix converter.
Figure 2A:
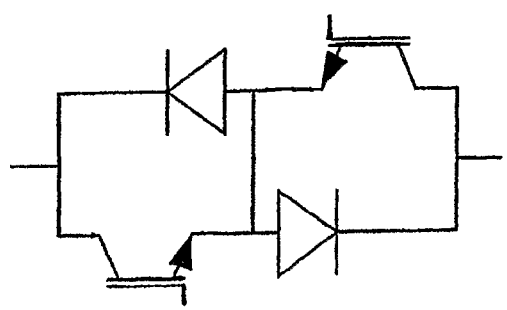
FIG. 2a is a circuit diagram showing a bi-directional switch implementation using a pair of fast recovery diodes (FRD) and a pair of Insulated Gate Bipolar Transistors (IGBTs) connected together in anti-parallel and in a common collector arrangement.
Figure 2B:
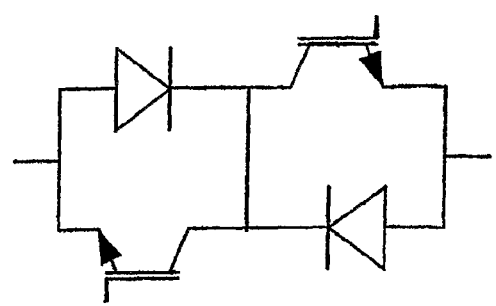
FIG. 2b is a circuit diagram showing a bi-directional switch implementation using a pair of fast recovery diodes (FRD)
Figure 3:
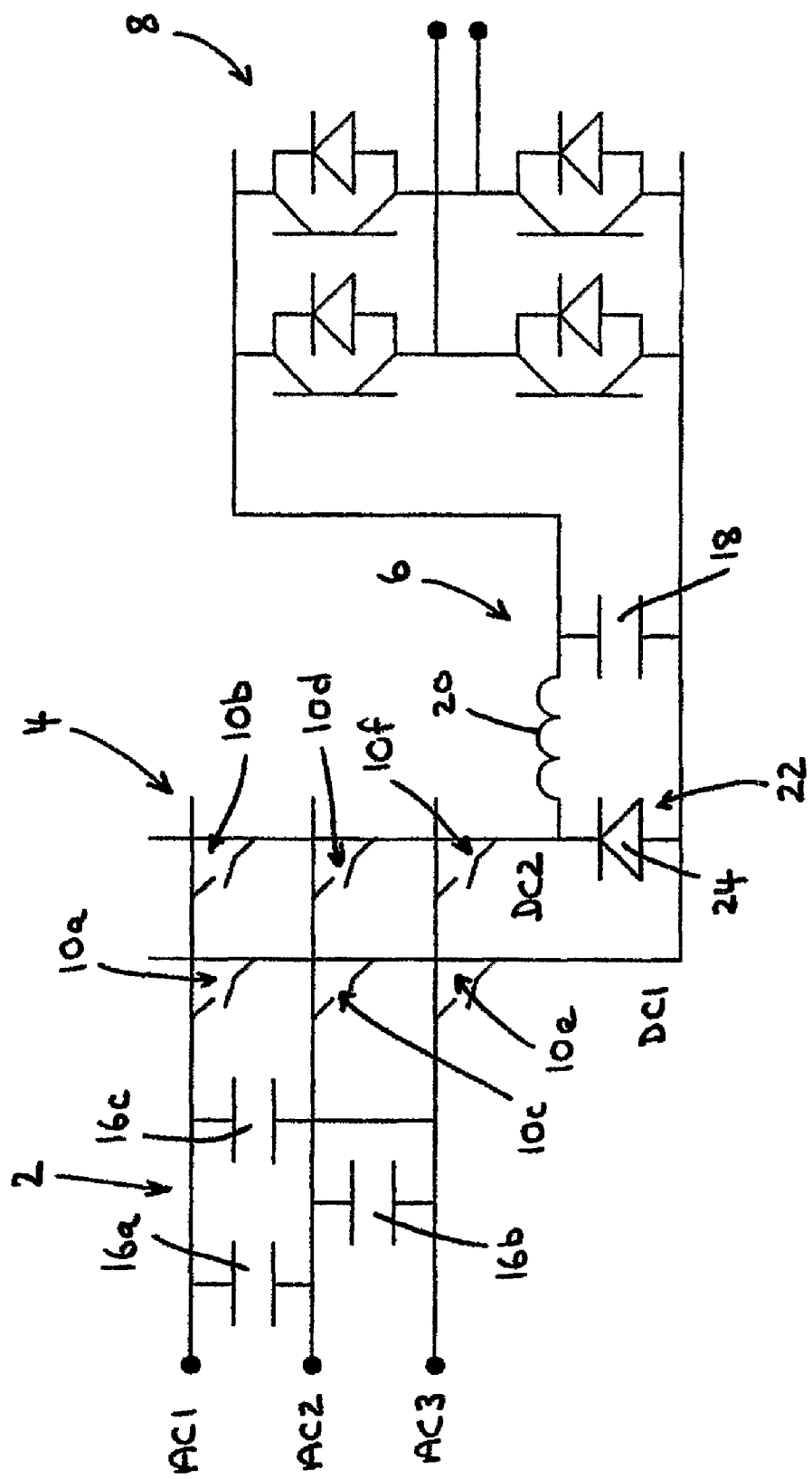
Figure 4:
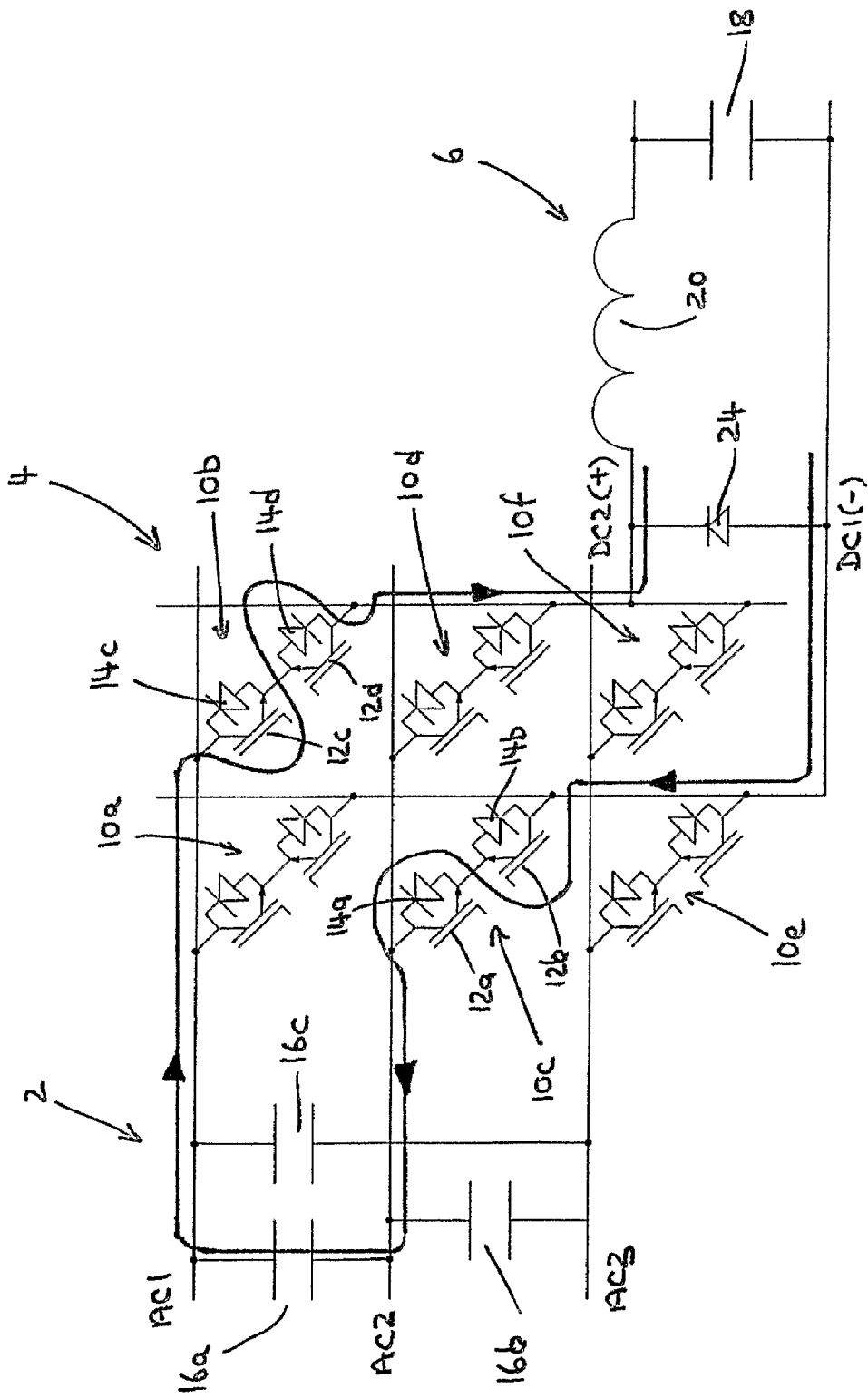
Figure 5:
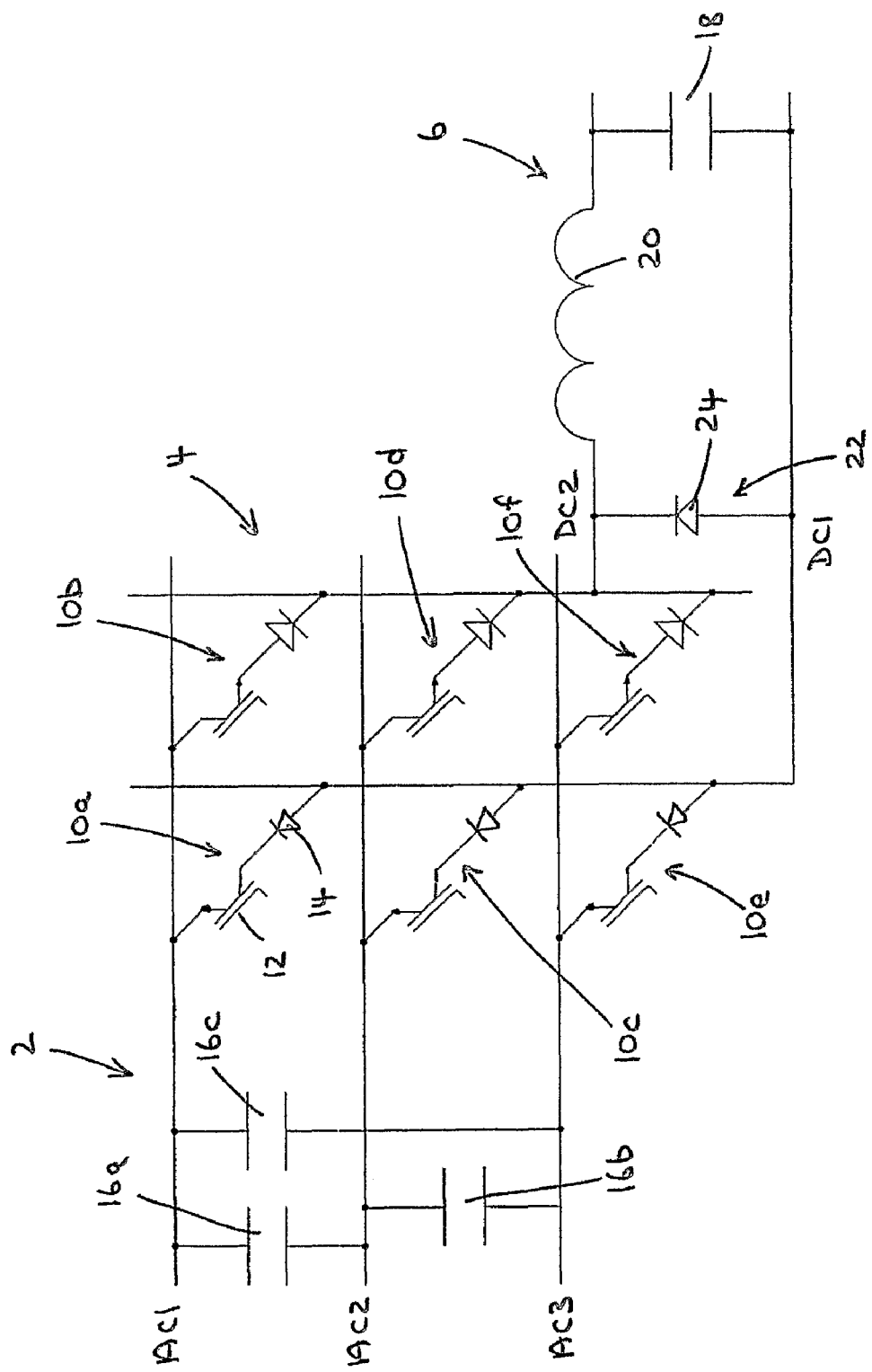
Figure 6:
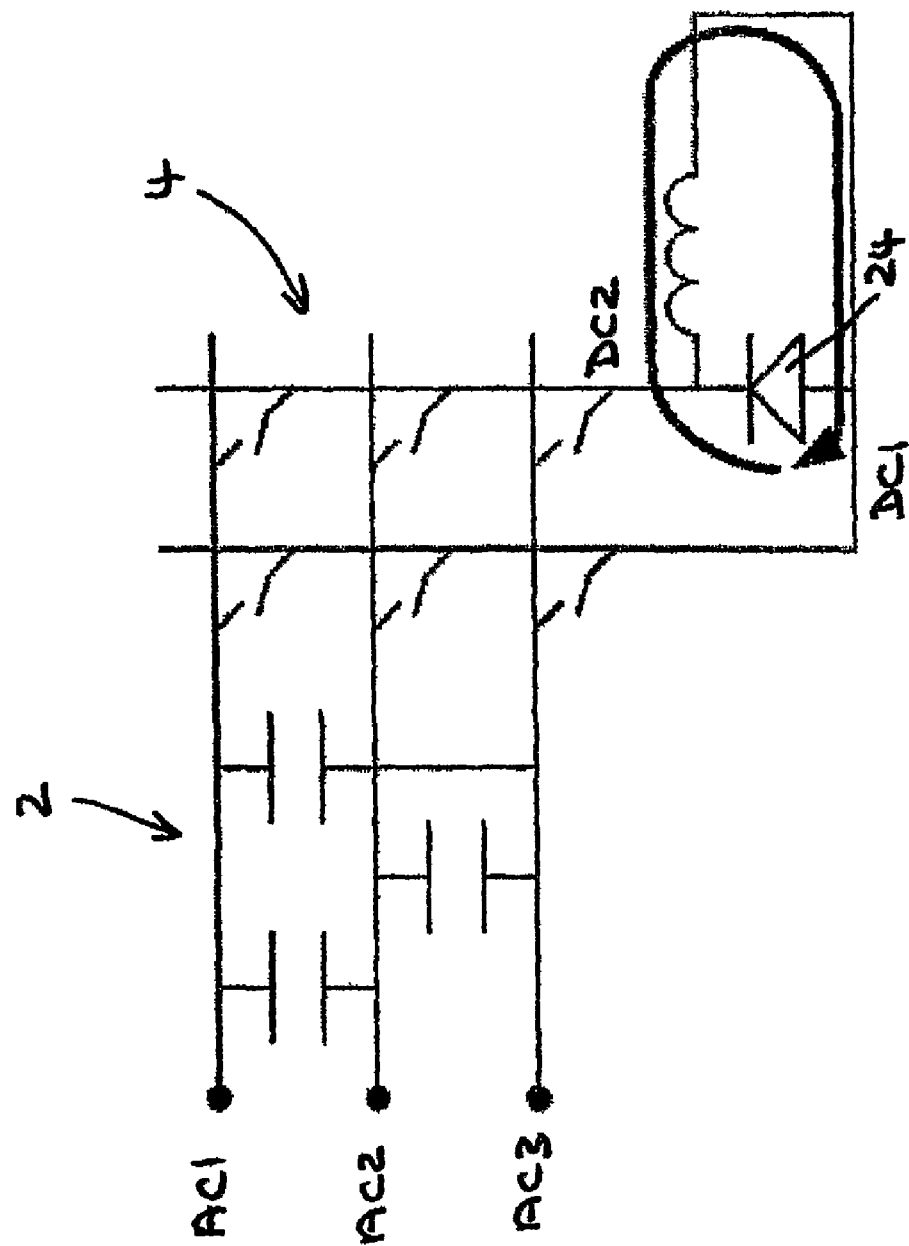
Figure 7:
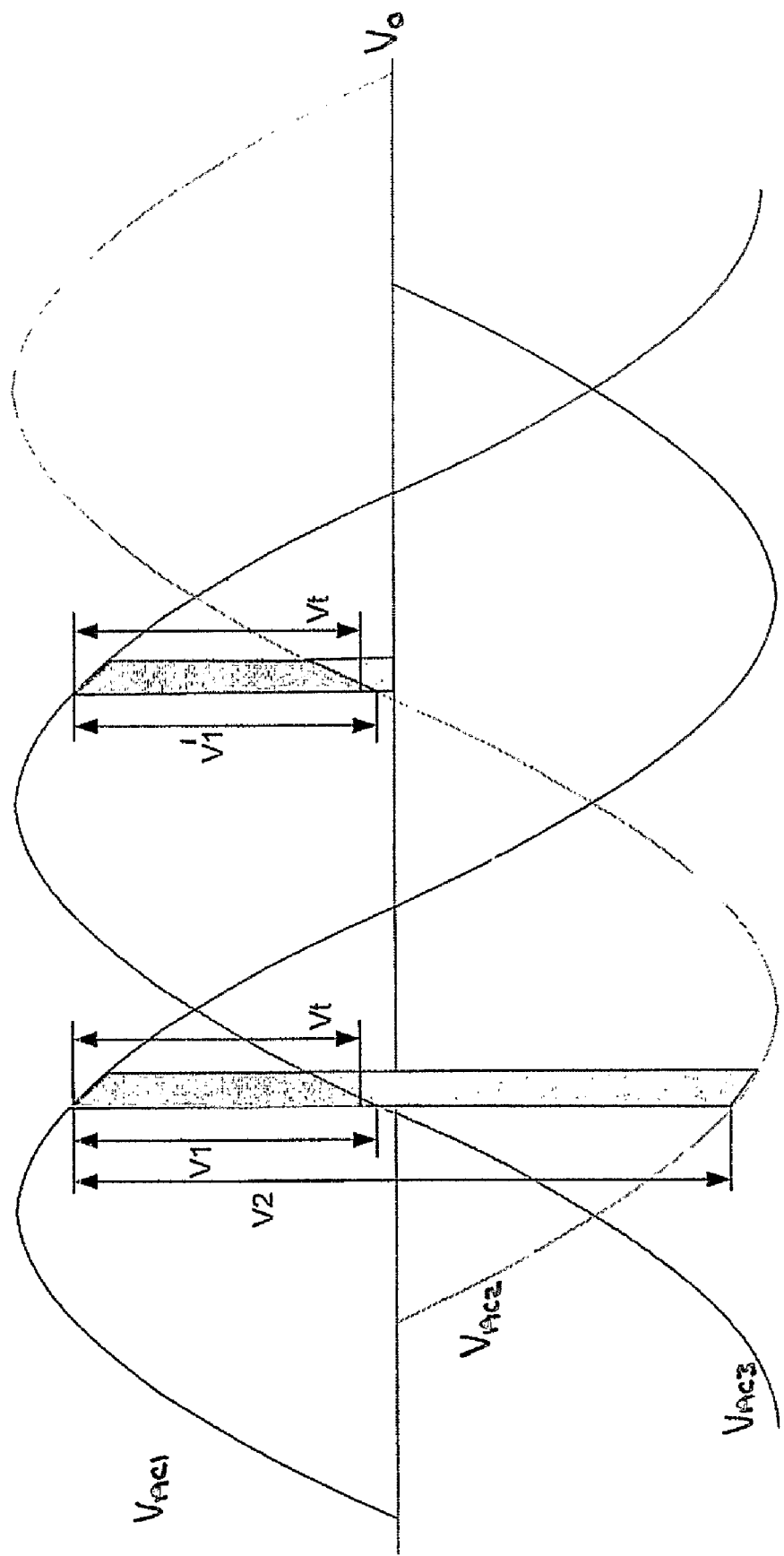
Figures 8, 9:
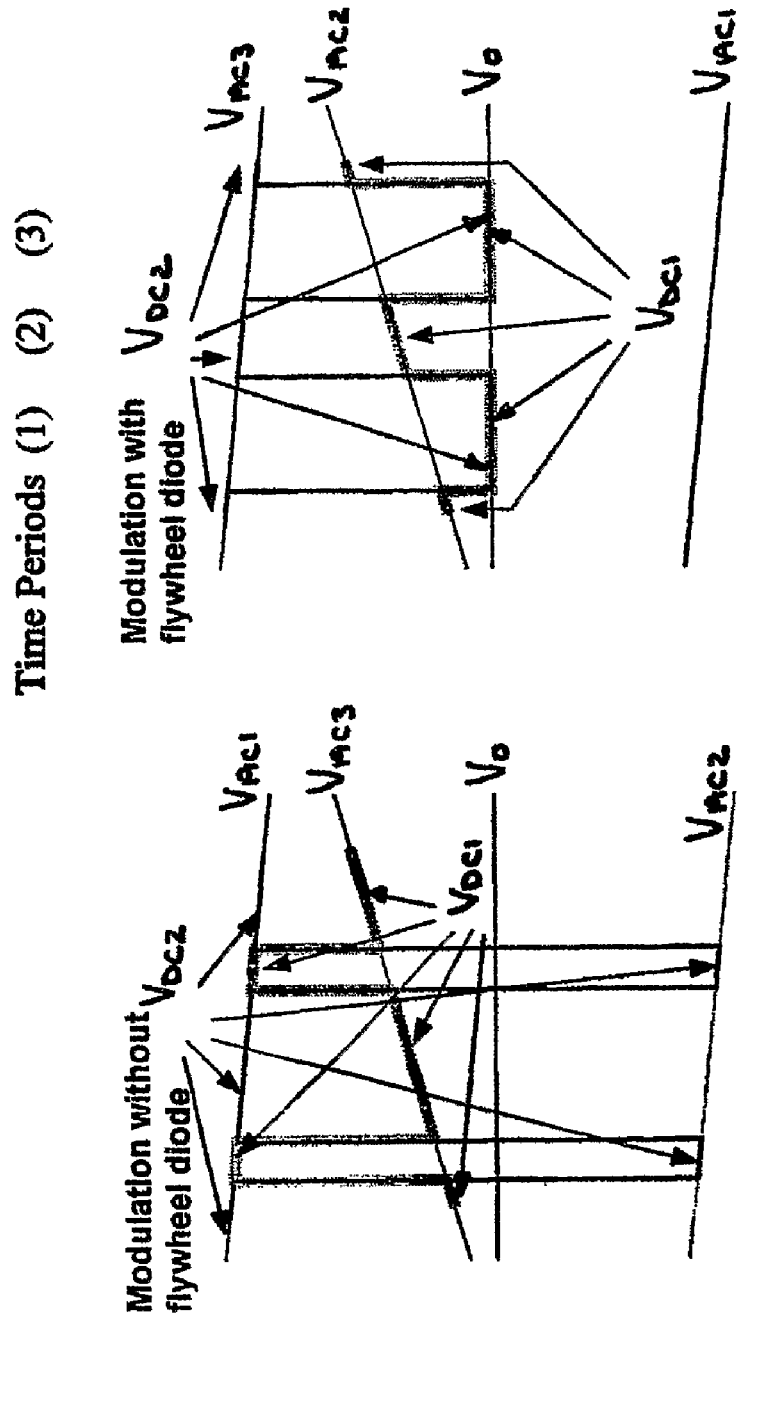
Figure 10:
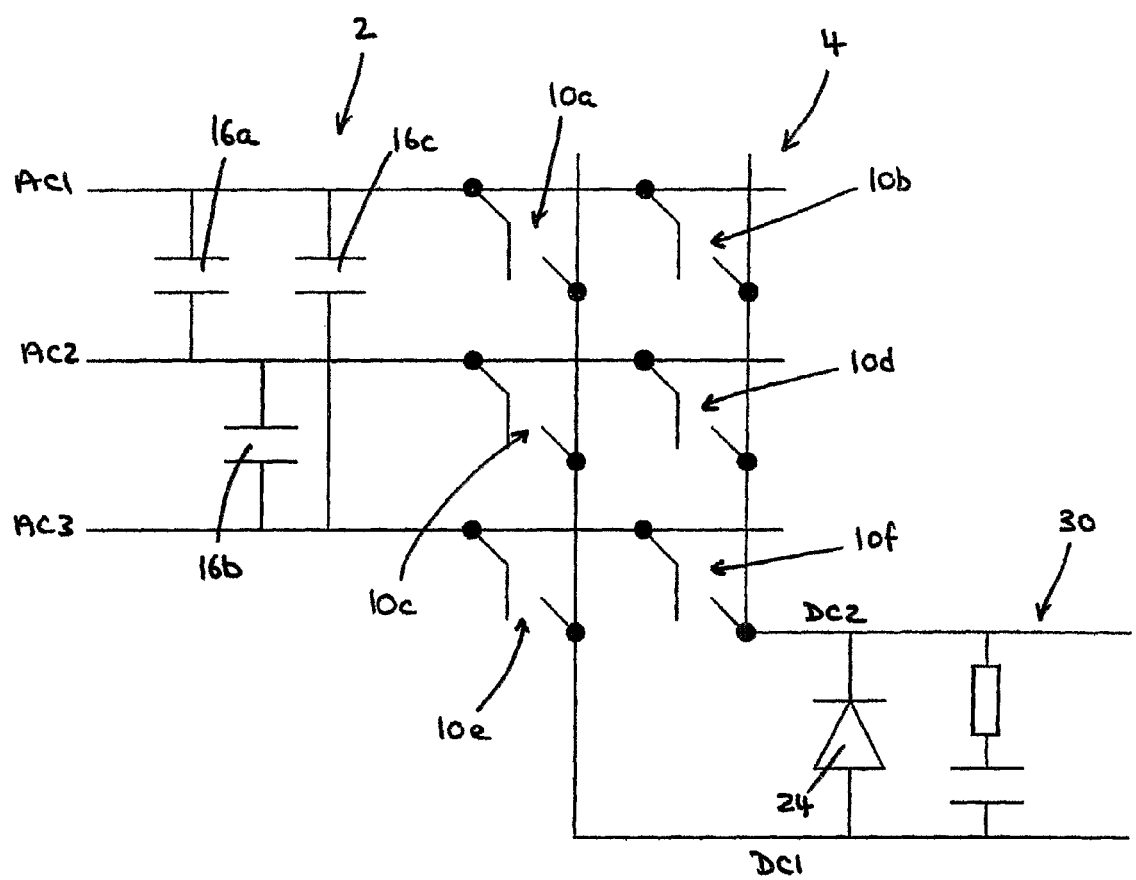
Figure 11:
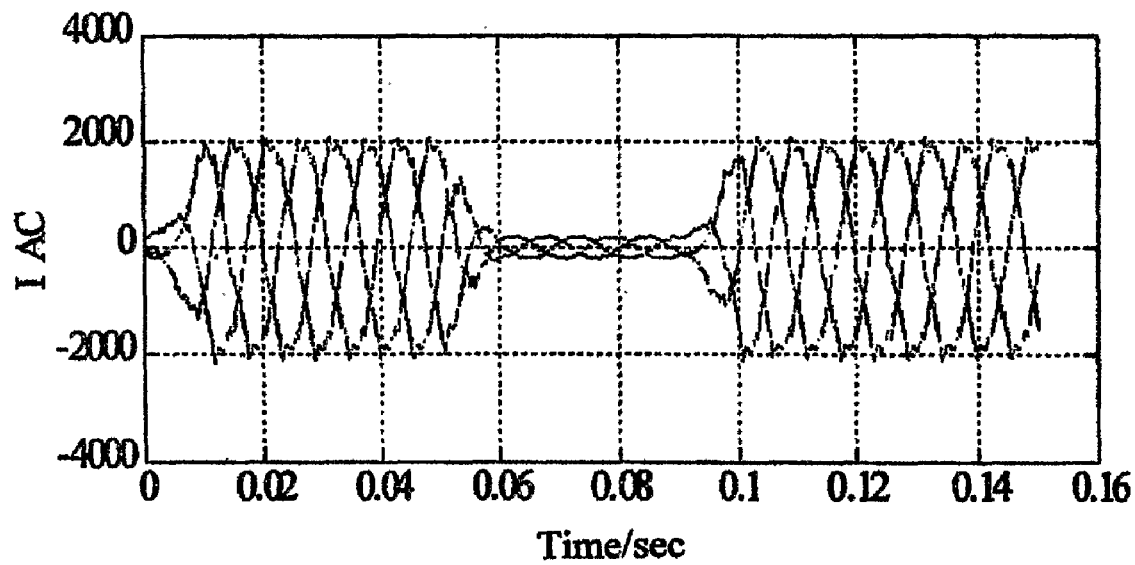
Figure 12:
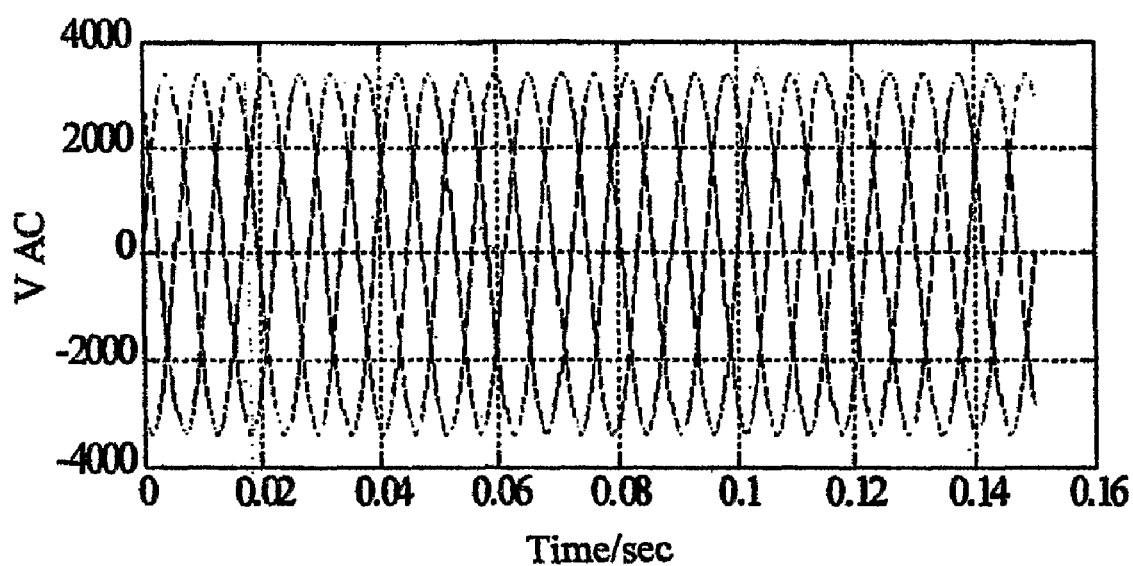
Figure 13:
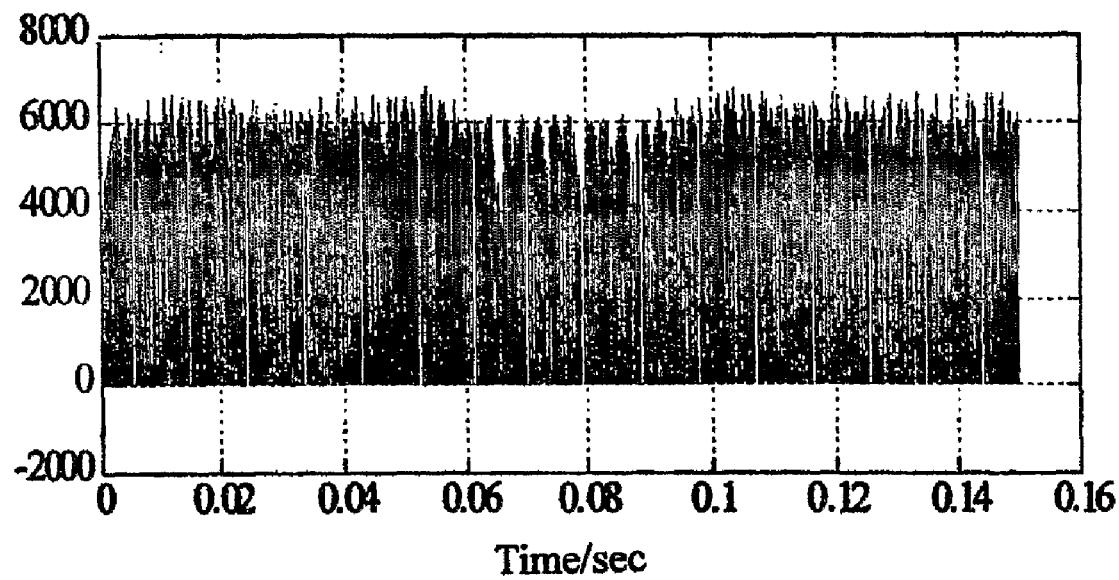
Figure 14:
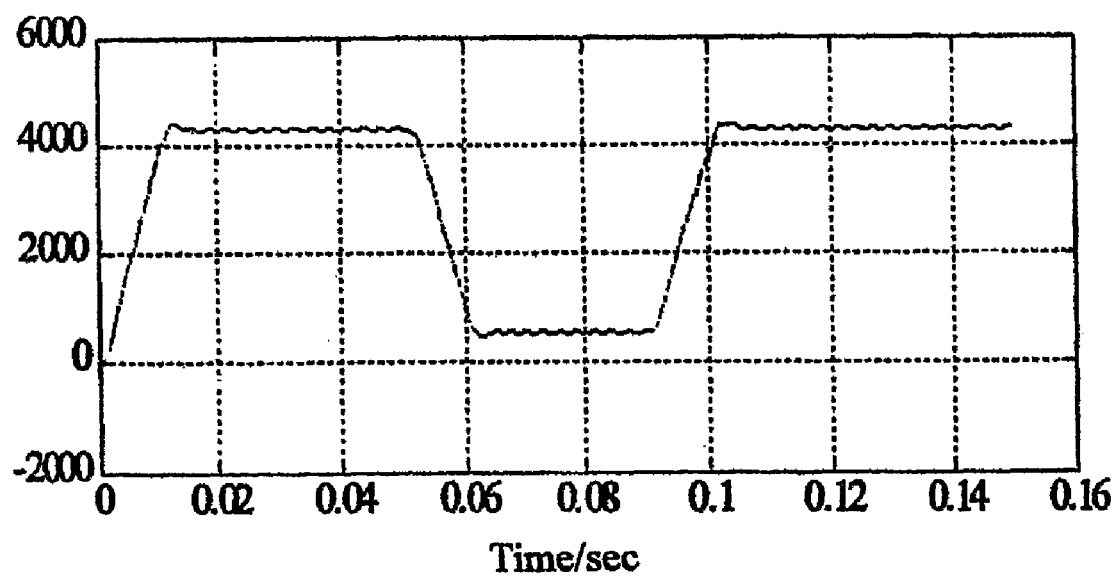
Figure 15:
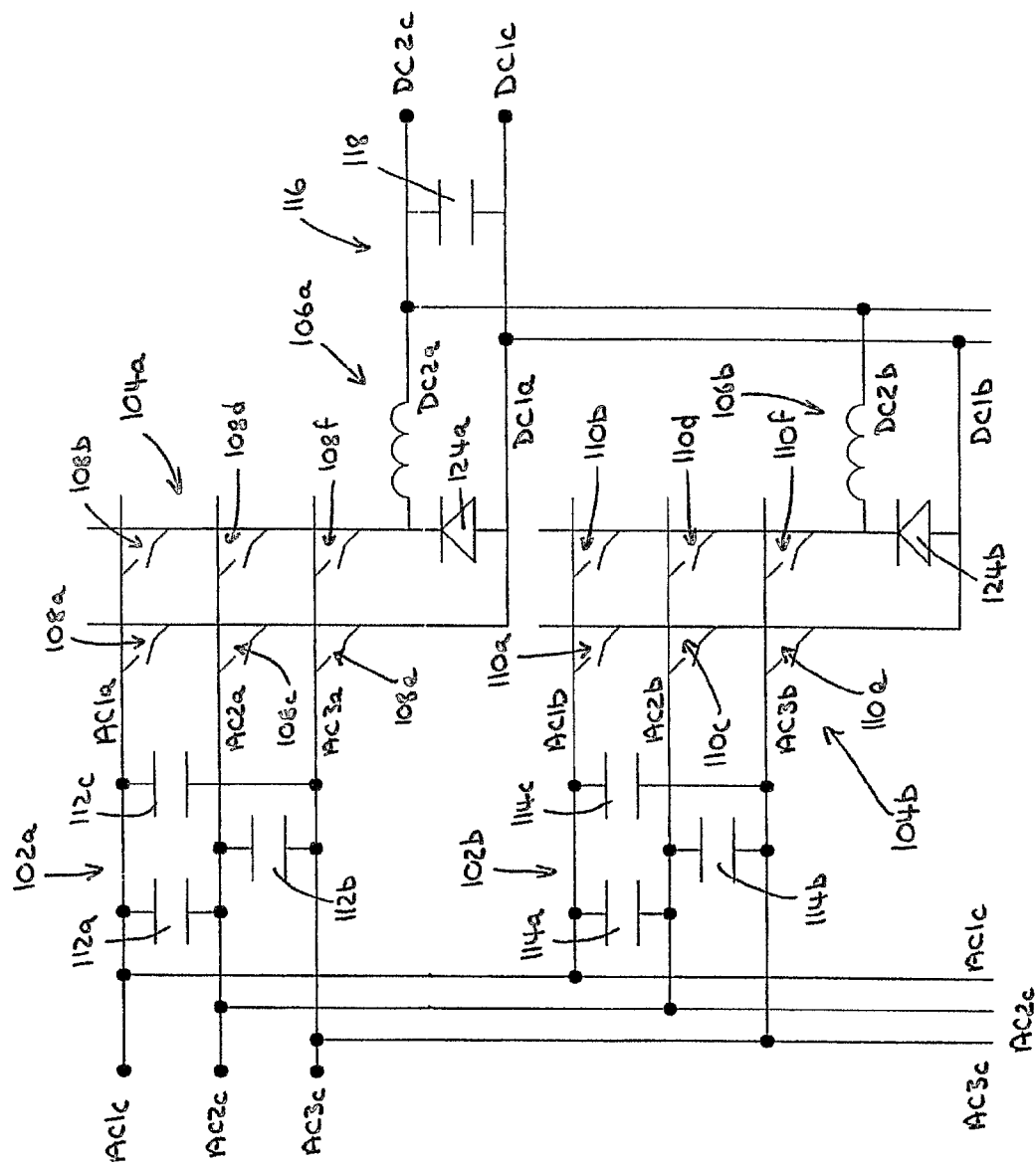

and a pair of Insulated Gate Bipolar Transistors (IGBTs) connected together in series-parallel and in a common emitter arrangement;

FIG. 3 is a circuit diagram of a two-stage power converter incorporating a matrix converter according to the present invention;

FIG. 4 is a circuit diagram of a matrix converter according to the present invention that is suitable for motoring and generating applications;

FIG. 5 is a circuit diagram of a matrix converter according to the present invention that is only suitable for motoring applications;

FIG. 6 is a circuit diagram showing the current flow through the matrix converter when the dc output lines are not connected to any of the dc input lines (i.e. the matrix converter is in the "fifth state");

FIG. 7 is a schematic diagram showing how the target voltage of the matrix converter is obtained using pulse width modulation techniques;

FIG. 8 is a schematic diagram showing how pulse width modulation techniques are applied in a conventional matrix converter;

FIG. 9 is a schematic diagram showing how pulse width modulation techniques are applied in a matrix converter according to the present invention;

FIG. 10 is a circuit diagram showing how a switching aid network (snubber) can be connected across the dc voltage lines of the matrix converter;

FIG. 11 is a diagram showing the current waveform of an ac input voltage supplied to the matrix converter;

FIG. 12 is a diagram showing the voltage waveform of an ac input voltage supplied to a matrix converter;

FIG. 13 is a diagram showing the voltage waveform of the unfiltered dc output voltage provided by the matrix converter;

FIG. 14 is a diagram showing the voltage waveform of the filtered dc output voltage provided by the matrix converter; and FIG. 15 is a circuit diagram showing how two matrix converters according to the present invention can be connected together in parallel.

DETAILED DESCRIPTION OF THE PREFERRED EMBODIMENTS

The topology and operation of a matrix converter according to the present invention will now be explained with references to FIG. 3 to 6. FIG. 3 shows a basic two-stage power converter including an ac line filter 2, a matrix converter 4, a dc-link filter 6 and a voltage source inverter 8. Any other suitable type of inverter (such as a current source inverter, for example) can be used in place of the voltage source inverter 8 depending on the particular application. The voltage source inverter 8 of the power converter may be implemented using the ALSTOM VDM25000 product, available from ALSTOM Power Conversion Limited, Marine and Offshore Division, Boughton Road, Rugby, CV21 IBU, United Kingdom.

The matrix converter 4 includes three ac voltage lines labelled AC1, AC2 and AC3, and two dc voltage lines labelled DC1 and DC2. Six switch assemblies 10a to 10f allow any of the ac voltage lines AC1, AC2 and AC3 to be connected to any of the dc voltage lines DC1 and DC2. For example, the switch assembly 10a can connect the first ac voltage line AC1 to the first dc voltage line DC1, the switch assembly 10b can connect the first ac voltage line AC2 to the second dc voltage line DC2 and so on. The switch assemblies 10a to 10f can be uni-directional or bi-directional, depending on whether the matrix converter is to be used for motoring or generating applications.

In a motoring application, a three-phase ac input voltage is supplied to the ac voltage lines AC1, AC2 and AC3 from a supply network and rectified by the matrix converter 4 to provide a dc output voltage on dc voltage lines DC1 and DC2. The dc output voltage is supplied to the voltage source inverter 8 where it is inverted. The resulting ac output voltage from the two-stage power converter can be supplied to a motor (not shown) for the purposes of speed control, for example.

In a generating application, a dc input current is supplied to the dc voltage lines DC1 and DC2 and inverted by the matrix converter 4 to provide an ac output voltage on the ac voltage lines AC1, AC2 and AC3. It is important to note that although the matrix converter 4 can be used for generating applications, the main benefits of the invention are only realised during motoring applications.

With reference to FIG. 4, if the matrix converter 4 is to be used for motoring and generating applications then current must be able to pass through each switch assembly 10a to 10f in both directions. Each switch assembly 10a to 10f therefore contains a back to back pair of IGBT devices 12 and diodes 14 in a series-parallel arrangement.

If two of the switch assemblies 10c and 10b are considered in isolation then it can be seen that for motoring applications, if these switches in particular are closed and the voltage in the second dc voltage line DC2 is positive with respect to the voltage in the first dc voltage line DC1, then current can circulate between the first and second ac voltage lines AC1 and AC2, and the dc voltage lines DC1 and DC2 through one of the IGBT devices 12b and one of the diodes 14a, and through one of the IGBT devices 12c and one of the diodes 14d, via the AC line filter capacitor 16a. The path of the circulating current for motoring applications is indicated by the freeform arrow. For generating applications, current can circulate between the first and second ac voltage lines AC1 and AC2, and the dc voltage lines DC1 and DC2 through the other of the IGBT devices 12a and the other of the diodes 14b, and through the other of the IGBT devices 12d and the other of the diodes 14c, via the AC line filter capacitor 16a.

Making the switch assemblies 10a to 10f bi-directional also permits current to flow in both directions with either positive or negative dc voltage polarity in the dc voltage lines DC1 and DC2.

If the matrix converter 4 is to be used only for motoring applications then the switch assemblies 10a to 10f can be simplified as shown in FIG. 5. In this case, each switch assembly contains only a single IGBT device 12 and a diode 14. The polarity of the IGBT device 12 and the diode 14 is chosen to block current flowing in the reverse (or generating) direction. As shown in FIG. 5, the voltage in the second dc voltage line DC2 will always be positive with respect to the voltage in the first dc voltage line DC1. The ac line filter 2 includes three delta-connected capacitors 16a, 16b and 16c arranged between each of the three ac voltage lines AC1, AC2 and AC3. It will be readily appreciated that the capacitors can also be connected together in a star arrangement. The dc-link filter 6 includes a capacitor 18 arranged between the two dc voltage lines DC1 and DC2, and a series inductor 20.

The principle feature of the matrix converter 4 according to the present invention is the addition of a freewheel path 22 between the dc voltage lines DC1 and DC2. This can be a switched freewheel path (containing a thyristor, for example) or a simple freewheel diode 24 as shown. The purpose of the freewheel path 22 is to provide a "fifth state" in addition to the three states provided by connecting each of the ac voltage lines AC1, AC2 and AC3 to both of the dc voltage lines DC1 and DC2 using the switch assemblies 10a to 10f, and the fourth state that is provided by connecting both of the dc voltage lines DC1 and DC2 to the same ac voltage line. This is best explained with reference to Table 1 shown below. If the matrix converter 4 is being used for a motoring application then it will be appreciated that the two dc voltage lines DC1 and DC2 (output lines) can be connected to the three ac voltage lines AC1, AC2 and AC3 (input lines) in any of the following combinations.

TABLE 1

| DC1 | DC2 | |
|-----|-----|-----|
| AC1 | AC2 | "first state" |
| AC2 | AC1 | |
| AC1 | AC3 | "second state" |
| AC3 | AC1 | |
| AC2 | AC3 | "third state" |
| AC3 | AC2 | |
| AC1 | AC1 | "fourth state" |
| AC2 | AC2 | |
| AC3 | AC3 | |
| — | — | "fifth state" |

In the "first state", one of the dc voltage lines DC1 and DC2 is connected to the first ac voltage line AC1 and the other of the dc voltage lines DC1 and DC2 is connected to the second ac voltage line AC2. The dc output voltage across the dc voltage lines DC1 and DC2 at that particular instant is therefore derived from the ac input voltages supplied to the first and second ac voltage lines AC1 and AC2.

In the "second state", one of the dc voltage lines DC1 and DC2 is connected to the first ac voltage line AC1 and the other of the dc voltage lines DC1 and DC2 is connected to the third ac voltage line AC3. The dc output voltage across the dc voltage lines DC1 and DC2 at that particular instant is therefore derived from the ac input voltages supplied to the first and third ac voltage lines AC1 and AC3.

In the "third state", one of the dc voltage lines DC1 and DC2 is connected to the second ac voltage line AC2 and the other of the dc voltage lines DC1 and DC2 is connected to the third ac voltage line AC3. The dc output voltage across the dc voltage lines DC1 and DC2 at that particular instant is therefore derived from the ac input voltages supplied to the second and third ac voltage lines AC2 and AC3.

In the "fourth state" where the two dc voltage lines DC1 and DC2 are connected to the same ac voltage line there is no voltage output because the dc voltage lines are shorted together.

The matrix converter 4 also provides for a "fifth state" where the dc voltage lines DC1 and DC2 are not connected to any of the ac voltage lines AC1, AC2 and AC3. In this situation, current flowing in the dc-link filter 6 is provided with a natural path through the freewheel diode 24 and there is no risk of causing an over-voltage. The arrow in FIG. 6 represents the current flow when the matrix converter is in the "fifth state". The current flowing in the dc-link filter 6 is that previously established in the load as a result of the other states being applied to the load.

The way in which the waveform of the output dc voltage is produced using pulse width modulation techniques will now be explained with reference to FIGS. 7 to 9.

FIG. 7 shows the sinusoidal three-phase input ac voltage $V_{AC1}$, $V_{AC2}$ and $V_{AC3}$ supplied to the ac voltage lines AC1, AC2 and AC3 over a period of time and symmetrically disposed about the zero voltage $V_0$. The shaded area on the left represents the pulse width modulation technique that would be used in a conventional matrix converter without a freewheel path. The shaded area on the right represents the pulse width modulation technique that is used in the matrix converter 4 with the freewheel path. These different pulse width modulation techniques are shown in more detail in FIGS. 8 and 9, respectively. In each case, the matrix converter 4 is being used to generate a dc target voltage $V_t$ between the dc voltage lines DC1 and DC2. The pulse width modulation will be carried out at a rate that is considerably greater than the frequency of the three-phase ac input voltage. Sampling rates for pulse width modulation around 2 kHz are normal for three-phase ac input voltages operating at 50 Hz.

With reference to the shaded area between $V_{AC1}$ and $V_{AC2}$ in FIG. 7, voltage state $V_1$ represents the difference between the ac input voltage $V_{AC1}$ supplied to the first ac voltage line AC1 and the ac input voltage $V_{AC3}$ supplied to the third ac voltage line AC3 at that particular instance in time. Similarly, the voltage state $V_2$ represents the difference between the ac input voltage $V_{AC1}$ supplied to the first ac voltage line AC1 and the ac input voltage $V_{AC2}$ supplied to the second ac voltage line AC2 at that particular instance in time. The target voltage $V_t$ is slightly smaller than voltage state $V_1$ so it is necessary to pulse width modulate between the voltage state $V_1$ and the voltage state $V_2$. The switch assemblies are therefore controlled to connect the dc voltage lines DC1 and DC2 with the appropriate ac voltage lines AC1, AC2 and AC3 so that the dc output voltage of the matrix converter (i.e. the dc output voltages $V_{DC1}$ and $V_{DC2}$ supplied by the dc voltage lines DC1 and DC2) is pulse width modulated between the voltage states $V_1$ and $V_2$ in such a way that the time average is equal to the target voltage $V_t$.

More particularly, FIG. 8 shows that the first dc voltage line DC1 (here $V_{DC1}$ is represented by the grey line) should be connected to the first ac voltage line AC1 for a first period of time, then connected to the third ac voltage line AC3 for a second period of time, then connected to the first ac voltage line AC1 for a third period of time and so on. The second dc voltage line DC2 (here $V_{DC2}$ is represented by the black line) should be connected to the second ac voltage line AC2 for a first period of time, then connected to the first ac voltage line AC1 for a second period of time, then connected to the second ac voltage line AC2 for a third period of time and so on. The time sequence for the pulse width modulation can be represented by Table 2 shown below.

TABLE 2

| | Line colour | Time Period (1) | Time Period (2) | Time Period (3) |
|---|---|---|---|---|
| $V_{DC1}$ | Grey | AC1 | AC3 | AC1 |
| $V_{DC2}$ | Black | AC2 | AC1 | AC2 |

With reference to the shaded area between $V_{AC3}$ and $V_0$ in FIG. 7, the matrix converter 4 of the invention benefits from the additional voltage state $V_0$ provided by the freewheel diode 24. In this case, the voltage state $V_1'$ represents the difference between the ac input voltage $V_{AC3}$ supplied to the third ac voltage line AC3 and the ac input voltage $V_{AC2}$ supplied to the second ac voltage line AC2 at that particular instance in time. The target voltage $V_t$ is slightly smaller than voltage state $V_1'$ so it is necessary to pulse width modulate between the voltage state $V_1'$ and another voltage state. However, in this case the zero voltage state $V_0$ can be used by opening all of the switch assemblies 10a to 10f and placing the matrix converter 4 in the "fifth state". The switch assemblies are therefore controlled to connect the dc output lines DC1 and DC2 with the appropriate ac voltage lines AC1, AC2 and AC3, and also to none of the ac voltage lines AC1, AC2 and AC3, so that the dc output voltage (i.e. the dc output voltages $V_{DC1}$ and $V_{DC2}$ supplied by the dc voltage lines DC1 and DC2) of the matrix converter 4 is pulse width modulated between the voltage states $V_1'$ and $V_0$ in such a way that the time average is equal to the target voltage $V_t$.

More particularly, and with reference to FIG. 9, the time sequence for the pulse width modulation using the "fifth state" can be represented by Table 3 shown below.

TABLE 3

| | Line colour | Time Period (1) | Time Period (2) | Time Period (3) |
|---|---|---|---|---|
| $V_{DC1}$ | Grey | No connection | AC2 | No connection |
| $V_{DC2}$ | Black | No connection | AC3 | No connection |

The flywheel diode 24 has lower conduction losses than the switch assemblies 10a to 10f. The use of the zero voltage $V_0$ as an additional voltage state therefore has the effect of reducing the switching device dissipation and improving the efficiency of the matrix converter 4.

The use of the zero voltage $V_0$ also provides a reduction in the common mode voltage of the matrix converter 4. The common mode voltage is most conveniently expressed as $(V_{DC1}+V_{DC2})/2$, relative to the neutral voltage $V_0$ and where $V_{DC1}$ is the dc output voltage supplied by the first dc voltage line DC1 and $V_{DC2}$ is the dc output voltage supplied by the second dc voltage line DC2. When the matrix converter 4 is operated in the "fifth state" such that the dc voltage lines DC1 and DC2 are not connected to any of the ac voltage lines AC1, AC2 and AC3 and the current flows in the freewheel diode 24, it will be readily appreciated that there is no common mode voltage between the zero voltage $V_0$ and the dc voltage lines DC1 and DC2. When the matrix converter 4 is pulse width modulated to give a low dc output voltage, the flywheel diode 24 conducts for the majority of the time and the pulse width modulation strategy is given the greatest possible freedom to exploit switching states that minimise the common mode voltage at the dc voltage lines DC1 and DC2. This reduces stresses on the load system and the power converter equipment insulation. It also benefits electromagnetic compatibility (EMC).

The matrix converter 4 can include a snubber to optimise switching losses, component ratings and EMC. The simplest type of snubber that can be used is the series capacitor resistor type 30 as shown in FIG. 10. However, it will be readily appreciated that any suitable type of snubber can be used with the matrix converter 4. The basic principle of operation of the snubber is as follows. When a semiconductor device commutates, energy is trapped in stray inductance and this inductance opposes the action of commutation in the semiconductor device by developing a transient voltage that opposes any change in current. A corresponding transient voltage is experienced by the semiconductor device. This transient voltage strongly influences the semiconductor peak voltage and the switching dissipation ratings. A snubber is connected parallel to the semiconductor device (i.e. in series with any stray inductance whose current is being interrupted by the semiconductor device). When the semiconductor device commutates, the transient voltage causes current to flow in the snubber. The predominantly capacitive character of the snubber serves to moderate the transient behaviour of the system in a manner that benefits the semiconductor device ratings and EMC, while at the same time incurring an undesirable dissipation in the snubber.

With reference to FIG. 10 a single capacitor resistor type snubber 30 is shown connected in parallel with the flywheel diode 24. No snubbers are applied to any of the switch assemblies 10a to 10f. This is because whatever switch state is applied to the matrix converter 4, the snubber 30 is always in series with the stray inductance. The snubber 30 therefore provides damping whether the commutation is initiated by the flywheel diode 24, a single switch assembly, or by the simultaneous operation of two switch assemblies in the matrix converter 4. In other words, the benefits of the snubber 30 are experienced by all of the switch assemblies 10a to 10f in addition to the flywheel diode 24. This improves the efficiency of the matrix converter 4 and greatly simplifies the circuit design.

In more advanced cases, such as when the switch assemblies 10a to 10f, and the flywheel diode 24, consist of two or more semiconductor devices connected in series, then dedicated snubbers are often conventionally used for series voltage sharing. The addition of the snubber 30 connected in parallel with the freewheel diode 24 means that the rating and complexity of the dedicated snubbers can be reduced. A conventional N+1 series redundancy strategy may therefore be employed without compromising the overall efficiency of the matrix converter 4.

FIGS. 11 and 12 show the typical current and voltage waveforms of a three-phase ac supply voltage supplied to the ac voltage lines AC1, AC2 and AC3 of the matrix converter 4. FIG. 13 shows the unfiltered dc output voltage waveform that is produced by the matrix converter 4. Finally, FIG. 14 shows the regulated dc output voltage waveform of the matrix converter 4 after it has been filtered by the dc-link filter 6. The waveforms demonstrate that the matrix converter 4 retains the high supply power factor and low supply distortion of conventional matrix converters. In FIGS. 11 and 12 the current and voltage are shown in phase. This is desirable in some applications. The matrix converter according to the present invention shares a similar ability to control the supply power factor as conventional matrix converters.

An alternative power converter is shown in FIG. 15 without an inverter. The power converter consists of a first parallel path including a first ac line filter 102a, a first matrix converter 104a and a first dc-link choke (or inductor) 106a, and a second parallel path including a second ac line filter 102b, a second matrix converter 104b and a second dc-link choke (or inductor) 106b. Although the power converter of FIG. 15 includes a first parallel path and second parallel path, it will be readily appreciated that the alternative power converter may include any number of parallel paths.

The first matrix converter 104a includes three ac voltage lines labelled AC1a, AC2a and AC3a and two dc voltage lines labelled DC1a and DC2a. Six switch assemblies 108a to 108f allow any of the ac voltage lines AC1a, AC2a and AC3a to be connected to any of the dc voltage lines DC1a and DC2a. For example, the switch assembly 108a can connect the first ac voltage line AC1a to the first dc voltage line DC1a, the switch assembly 108b can connect the first ac voltage line AC1a to the second dc voltage line DC2a and so on. The switch assemblies 108a to 108f can be uni-directional or bidirectional, depending on whether the first matrix converter 104a is to be used for motoring or generating applications. A freewheel diode 124a is provided between the dc voltage lines DC1a and DC2a. The purpose of the freewheel diode 124a is to provide a "fifth state" for the first matrix converter 104a as described above.

The first ac line filter 102a includes three capacitors 112a, 112b and 112c arranged between each of the three ac voltage lines AC1a, AC2a and AC3a.

The second matrix converter 104b includes three ac voltage lines labelled AC1b, AC2b and AC3b and two dc voltage lines labelled DC1b and DC2b. Six switch assemblies 110a to 110f allow any of the ac voltage lines AC1b, AC2b and AC3b to be connected to any of the dc voltage lines DC1b and DC2b. For example, the switch assembly 110a can connect the first ac voltage line AC1b to the first dc voltage line DC1b, the switch assembly 110b can connect the first ac voltage line AC1b to the second dc voltage line DC2b and so on. The switch assemblies 110a to 110f can be uni-directional or bi-directional, depending on whether the second matrix converter 104b is to be used for motoring or generating applications. A freewheel diode 124b is provided between the dc voltage lines DC1b and DC2b. The purpose of the freewheel diode 124b is to provide a "fifth state" for the second matrix converter 104b as described above.

The second ac line filter 102b includes three capacitors 114a, 114b and 114c arranged between each of the three ac voltage lines AC1b, AC2b and AC3b.

The first and second matrix converters 104a and 104b operate in the same way as the matrix converter described above.

The ac voltage lines AC1a, AC2a and AC3a of the first matrix converter 104a and the ac voltage lines AC1b, AC2b and AC3b of the second matrix converter 104b are connected to three common ac voltage lines AC1c, AC2c and AC3c. Similarly, the dc voltage lines DC1a and DC2a of the first matrix converter 104a and the dc voltage lines DC1b and DC2b of the second matrix converter 104b are connected to two common dc voltage lines DC1c and DC2c. A dc-link filter 116 includes a capacitor 118 arranged between the two common dc voltage lines DC1c and DC2c.

In a motoring application, a three-phase ac input voltage is supplied to the common ac voltage lines AC1c, AC2c and AC3c from a supply network and rectified by the first and second matrix converters 104a and 104b to provide a dc output voltage on the common dc voltage lines DC1c and DC2c. The dc output voltage is supplied to an inverter (not shown but a voltage source inverter, for example) where it is inverted. The resulting ac output voltage from the inverter can be used to drive a variable speed drive (not shown), for example.

In a generating application, a dc input voltage is supplied to the common dc voltage lines DC1c and DC2c and inverted by the matrix converters 104a and 104b to provide an ac output voltage on the common ac voltage lines AC1c, AC2c and AC3c. It is important to note that although the first and second matrix converters 104a and 104b can be used for generating applications, the main benefits of the invention are only realised during motoring applications.

Because the first and second matrix converters 104a and 104b are connected to the common ac voltage lines AC1c, AC2c and AC3c and to the common dc voltage lines DC1c and DC2c, and these are filtered by ac line filters 102a, 102b and capacitor 118, the pulse width modulation switching losses of each matrix converter is de-coupled from that of the other matrix converter. This means that at any time during the operation of the power converter, one of the first and second matrix converters can be pulse suppressed while the other matrix converter is controlled according to a pulse width modulation strategy. In the general case where a number of parallel paths are provided, as more of the matrix converters are pulse suppressed the dissipation caused by the pulse width modulated switching losses is reduced but the dissipation caused by conduction losses of the semiconductor devices is increased. The number of matrix converters that are pulse suppressed and the number of matrix converters that are controlled according to a conventional pulse width modulation strategy can be set to optimise the total dissipation losses, thereby maximising the efficiency of the power converter. When a number of parallel-connected matrix converters are operated simultaneously they will be pulse width modulated with fundamental voltages in phase and in a manner that provides sharing of current. Pulse width modulation carriers may be preferentially phase shifted in order to minimise supply voltage distortion. When pulse suppressed, all switch devices will be continuously turned off and the pulse suppressed matrix converter will carry no ac line current. The freewheel diodes of the pulse suppressed matrix converters will carry pulses of current in some circumstances, for example when there is a low dc voltage at the common dc voltage lines DC1c and DC2c.

Although not shown, it will be readily appreciated that switching or other appropriate means can be provided to isolate each of the first and second matrix converters 104a and 104b from each other. In the event that one of the first and second matrix converters 104a and 104b suffers a catastrophic failure, it may be safely isolated and a conventional N+1 parallel redundancy may be provided. In general, switchgear or fuses may be provided to isolate the ac and/or dc terminals of one or more of the matrix converters from a larger group of matrix converters. A damaged or malfunctioning matrix converter can therefore be prevented from rendering the correctly functioning matrix converters unavailable for service, thereby providing a system of graceful degradation.

The pulse width modulation carriers of the first and second matrix converters 104a and 104b can be phase shifted in such a manner to optimise the phase cancellation of the ripple current flowing in the ac line filters 102a and 102b. The design of the ac line filters 102a and 102b can therefore be simplified and EMI can be minimised. More particularly, the matrix converters 104a and 104b inject pulses of current of magnitude determined by the current in the inductors 106a and 106b, at pulse width modulation sampling frequency, into ac line filters 102a and 102b. As a consequence, the ac line filters 102a and 102b experience voltage ripple at pulse width modulation sampling frequency. Pulsating currents may therefore be phase shifted to facilitate harmonic cancellation and reduce voltage distortion.

A single snubber (not shown but of the capacitor resistor type, for example) can be connected in parallel with each of the flywheel diodes 124a and 124b. Each parallel path therefore includes a single snubber. In this way, the transient response of the snubber in each parallel path can be decoupled from that of the snubbers in the other parallel paths. A result of this is that the matrix converter in any of the parallel paths can be pulse suppressed without incurring the switching losses associated with the pulse width modulation operation of the matrix converter in the other parallel paths. As mentioned above, the number of matrix converters that are pulse suppressed and the number of matrix converters that are controlled according to a pulse width modulation strategy can be set as required to optimise the efficiency of the power converter (this will be a trade off between the semiconductor conduction losses and the total switching losses). A conventional N+1 parallel redundancy strategy may therefore be employed without compromising the overall efficiency of the power converter.

The present invention has been described above purely by way of example, and modifications can be made within the scope of the invention as claimed. The invention also consists in any individual features described or implicit herein or shown or implicit in the drawings or any combination of any such features or any generalisation of any such features or combination, which extends to equivalents thereof. Thus, the breadth and scope of the present invention should not be limited by any of the above-described exemplary embodiments. Each feature disclosed in the specification, including the claims and drawings, may be replaced by alternative features serving the same, equivalent or similar purposes, unless expressly stated otherwise.

Any discussion of the prior art throughout the specification is not an admission that such prior art is widely known or forms part of the common general knowledge in the field.

Unless the context clearly requires otherwise, throughout the description and the claims, the words "comprise", "comprising", and the like, are to be construed in an inclusive as opposed to an exclusive or exhaustive sense; that is to say, in the sense of "including, but not limited to".

The invention claimed is:

1. A matrix converter comprising:
three ac voltage lines;
two dc voltage lines;
a first switch connected between a first one of the three ac voltage lines and a first one of the two dc voltage lines, a second switch connected between a second one of the three ac voltage lines and the first one of the two dc voltage lines, a third switch connected between a third one of the three ac voltage lines and the first one of the two dc voltage lines, a fourth switch connected between the first one of the three ac voltage lines and a second one of the two dc voltage lines, a fifth switch connected between the second one of the three ac voltage lines and the second one of the two dc voltage lines, and a sixth switch connected between the third one of the three ac voltage lines and the second one of the two dc voltage lines, the first, second, third, fourth, fifth and sixth switches being controlled to open and close in a sequence using pulse width modulation such that each of the three ac voltage lines can be connected to one of the two dc voltage lines when one of the first, second, third, fourth, fifth and sixth switches is closed; and
a freewheel path between the two dc voltage lines that includes a reverse-blocking device;
wherein the first, second, third, fourth, fifth and sixth switches are bi-directional such that the matrix converter can be used for motoring applications where a three-phase ac input voltage is supplied to the three ac voltage lines from a supply network and rectified by the matrix converter to provide a dc output voltage on the two dc voltage lines, and for generating applications where a dc input voltage is supplied to the two dc voltage lines and inverted by the matrix converter to provide an ac output voltage on the three ac voltage lines; and
wherein the first, second, third, fourth, fifth and sixth switches are controlled using the pulse width modulation to connect the dc voltage lines to appropriate ac voltage lines or to none of the ac voltage lines during a motoring application with the dc voltage lines having a respective dc voltage polarity, and to connect the three ac voltage lines to appropriate dc voltage lines or to none of the dc voltage lines during a generating application with the dc voltage lines having the same respective dc voltage polarity such that the matrix converter is adapted to regulate bi-directional power flow while retaining a uni-directional dc voltage.

2. A matrix converter according to claim 1, wherein the reverse-blocking device is a diode.

3. A matrix converter according to claim 1, wherein the freewheel path is a switched freewheel path.

4. A matrix converter according to claim 3, wherein the reverse-blocking device is a thyristor.

5. A matrix converter according to claim 3, wherein the reverse-blocking device is a semiconductor device having reverse blocking capabilities.

6. A matrix converter according to claim 5, wherein the semiconductor device is a RB-IGBT.

7. A matrix converter according to claim 5, wherein the semiconductor device is a RB-GTO.

8. A matrix converter according to claim 1, wherein the first, second, third, fourth, fifth and sixth switches include a semiconductor switch.

9. A matrix converter according to claim 8, wherein the semiconductor switch has reverse blocking capabilities.

10. A matrix converter according to claim 9, wherein the semiconductor switch is a RB-IGBT.

11. A matrix converter according to claim 9, wherein the semiconductor switch is a RB-GTO.

12. A matrix converter according to claim 8, wherein the first, second, third, fourth, fifth and sixth switches include a back to back pair of semiconductor switches and a pair of diodes connected together in a series-parallel arrangement.

13. A matrix converter according to claim 12, wherein the pair of semiconductor switches are IGBTs.

14. A matrix converter according to claim 13, wherein the pair of IGBTs have emitters that are connected together.

15. A matrix converter according to claim 13, wherein of the pair of IGBTs have collectors that are connected together.

16. A matrix converter according to claim 12, wherein the pair of semiconductor switches are MOSFETs.

17. A matrix converter according to claim 12, wherein the pair of semiconductor switches are IGCTs.

18. A matrix converter according to claim 12, wherein the pair of semiconductor switches are MCTs.

19. A matrix converter according to claim 12, wherein the pair of semiconductor switches are GTOs.

20. A matrix converter according to claim 12, wherein the pair of diodes are FRDs.

21. A matrix converter according to claim 12, wherein the pair of semiconductor switches and/or the pair of diodes have current ratings that are asymmetrical.

22. A power conversion method using a matrix converter comprising three ac voltage lines, two dc voltage lines, a first switch connected between a first one of the three ac voltage lines and a first one of the two dc voltage lines, a second switch connected between a second one of the three ac voltage lines and the first one of the two dc voltage lines, a third switch connected between a third one of the three ac voltage lines and the first one of the two dc voltage lines, a fourth switch connected between the first one of the three ac voltage lines and a second one of the two dc voltage lines, a fifth switch connected between the second one of the three ac voltage lines and the second one of the two dc voltage lines, and a sixth switch connected between the third one of the three ac voltage lines and the second one of the two dc voltage lines, the first, second, third, fourth, fifth and sixth switches being controlled to open and close in a sequence using pulse width modulation such that each of the three ac voltage lines can be connected to one of the two dc voltage lines when one of the first, second, third, fourth, fifth and sixth switches is closed, and a freewheel path between the two dc voltage lines that includes a reverse-blocking device, wherein the first, second, third, fourth, fifth and sixth switches are bi-directional such that the matrix converter can be used for motoring applications where a three-phase ac input voltage is supplied to the three ac voltage lines from a supply network and rectified by the matrix converter to provide a dc output voltage on the two dc voltage lines, and for generating applications where a dc input voltage is supplied to the two dc voltage lines and inverted by the matrix converter to provide an ac output voltage on the three ac voltage lines, and wherein the first, second, third, fourth, fifth and sixth switches are controlled using the pulse width modulation to connect the dc voltage lines to appropriate ac voltage lines or to none of the ac voltage lines during a motoring application with the dc voltage lines having a respective dc voltage polarity, and to connect the three ac voltage lines to appropriate dc voltage lines or to none of the dc voltage lines during a generating application with the dc voltage lines having the same respective dc voltage polarity such that the matrix converter is adapted to regulate bi-directional power flow while retaining a uni-directional dc voltage, the method comprising the steps of:

supplying a momentary sample of an ac voltage to the dc voltage lines; and opening the first, second, third, fourth, fifth and sixth switches of the matrix converter so that the dc current flows through the freewheel path.

23. A power converter comprising:
a matrix converter having three ac voltage lines, two dc voltage lines, a first switch connected between a first one of the three ac voltage lines and a first one of the two dc voltage lines, a second switch connected between a second one of the three ac voltage lines and the first one of the two dc voltage lines, a third switch connected between a third one of the three ac voltage lines and the first one of the two dc voltage lines, a fourth switch connected between the first one of the three ac voltage lines and a second one of the two dc voltage lines, a fifth switch connected between the second one of the three ac voltage lines and the second one of the two dc voltage lines, and a sixth switch connected between the third one of the three ac voltage lines and the second one of the two dc voltage lines, the first, second, third, fourth, fifth and sixth switches being controlled to open and close in a sequence using pulse width modulation such that each of the three ac voltage lines can be connected to one of the two dc voltage lines when one of the first, second, third, fourth, fifth and sixth switches is closed, and a freewheel path between the two dc voltage lines that includes a reverse-blocking device, wherein the first, second, third, fourth, fifth and sixth switches are bi-directional such that the matrix converter can be used for motoring applications where a three-phase ac input voltage is supplied to the three ac voltage lines from a supply network and rectified by the matrix converter to provide a dc output voltage on the two dc voltage lines, and for generating applications where a dc input voltage is supplied to the two dc voltage lines and inverted by the matrix converter to provide an ac output voltage on the three ac voltage lines, and wherein the first, second, third, fourth, fifth and sixth switches are controlled using the pulse width modulation to connect the dc voltage lines to appropriate ac voltage lines or to none of the ac voltage lines during a motoring application with the dc voltage lines having a respective dc voltage polarity, and to connect the three ac voltage lines to appropriate dc voltage lines or to none of the dc voltage lines during a generating application with the dc voltage lines having the same respective dc voltage polarity such that the matrix converter is adapted to regulate bi-directional power flow while retaining a uni-directional dc voltage; and an inverter.

24. A power converter according to claim 23, wherein the inverter is a current source inverter, operating as an inverter or a rectifier.

25. A power converter according to claim 24, wherein the inverter is a voltage source inverter, operating as an inverter or a rectifier.

26. A power converter according to claim 23, further comprising a dc-link filter connected between the dc voltage lines of the matrix converter.

27. A power converter according to claim 23, further comprising an ac line filter connected to the ac voltage lines of the matrix converter.

28. A power converter according to claim 23, further comprising a switching aid network (snubber) connected between the dc voltage lines of the matrix converter.

29. A power converter according to claim 28, wherein the switching aid network (snubber) is of the capacitor resistor type.

30. A power converter comprising:
a first matrix converter having three ac voltage lines, two dc voltage lines, a first switch connected between a first one of the three ac voltage lines and a first one of the two dc voltage lines, a second switch connected between a second one of the three ac voltage lines and the first one of the two dc voltage lines, a third switch connected between a third one of the three ac voltage lines and the first one of the two dc voltage lines, a fourth switch connected between the first one of the three ac voltage lines and a second one of the two dc voltage lines, a fifth switch connected between the second one of the three ac voltage lines and the second one of the two dc voltage lines, and a sixth switch connected between the third one of the three ac voltage lines and the second one of the two dc voltage lines, the first, second, third, fourth, fifth and sixth switches of the first matrix converter being controlled to open and close in a sequence using pulse width modulation such that each of the three ac voltage lines can be connected to one of the two dc voltage lines when one of the first, second, third, fourth, fifth and sixth switches of the first matrix converter is closed, and a freewheel path between the two dc voltage lines that includes a reverse-blocking device, wherein the first, second, third, fourth, fifth and sixth switches of the first matrix converter are bi-directional such that the first matrix converter can be used for motoring applications where a three-phase ac input voltage is supplied to the three ac voltage lines from a supply network and rectified by the first matrix converter to provide a dc output voltage on the two dc voltage lines, and for generating applications where a dc input voltage is supplied to the two dc voltage lines and inverted by the first matrix converter to provide an ac output voltage on the three ac voltage lines, and wherein the first, second, third, fourth, fifth and sixth switches of the first matrix converter are controlled using the pulse width modulation to connect the dc voltage lines to appropriate ac voltage lines or to none of the ac voltage lines during a motoring application with the dc voltage lines having a respective dc voltage polarity, and to connect the three ac voltage lines to appropriate dc voltage lines or to none of the dc voltage lines during a generating application with the dc voltage lines having the same respective dc voltage polarity such that the first matrix converter is adapted to regulate bi-directional power flow while retaining a uni-directional dc voltage; and a second matrix converter having three ac voltage lines, two dc voltage lines, a first switch connected between a first one of the three ac voltage lines and a first one of the two dc voltage lines, a second switch connected between a second one of the three ac voltage lines and the first one of the two dc voltage lines, a third switch connected between a third one of the three ac voltage lines and the first one of the two dc voltage lines, a fourth switch connected between the first one of the three ac voltage lines and a second one of the two dc voltage lines, a fifth switch connected between the second one of the three ac voltage lines and the second one of the two dc voltage lines, and a sixth switch connected between the third one of the three ac voltage lines and the second one of the two dc voltage lines, the first, second, third, fourth, fifth and sixth switches of the second matrix converter being controlled to open and close in a sequence using pulse width modulation such that each of the three ac voltage lines can be connected to one of the two dc voltage lines when one of the first, second, third, fourth, fifth and sixth switches of the second matrix converter is closed, and a freewheel path between the two dc voltage lines that includes a reverse-blocking device, wherein the first, second, third, fourth, fifth and sixth switches of the second matrix converter are bi-directional such that the second matrix converter can be used for motoring applications where a three-phase ac input voltage is supplied to the three ac voltage lines from a supply network and rectified by the second matrix converter to provide a dc output voltage on the two dc voltage lines, and for generating applications where a dc input voltage is supplied to the two dc voltage lines and inverted by the second matrix converter to provide an ac output voltage on the three ac voltage lines, and wherein the first, second, third, fourth, fifth and sixth switches of the second matrix converter are controlled using the pulse width modulation to connect the dc voltage lines to appropriate ac voltage lines or to none of the ac voltage lines during a motoring application with the dc voltage lines having a respective dc voltage polarity, and to connect the three ac voltage lines to appropriate dc voltage lines or to none of the dc voltage lines during a generating application with the dc voltage lines having the same respective dc voltage polarity such that the second matrix converter is adapted to regulate bi-directional power flow while retaining a uni-directional dc voltage;

wherein the three ac voltage lines of the first matrix converter and the three ac voltage lines of the second matrix converter are connected together, and the two dc voltage lines of the first matrix converter and the two dc voltage lines of the second matrix converter are connected together, such that the first and second matrix converters are arranged in parallel.

31. A power converter according to claim 30, further comprising an ac line filter connected to the ac voltage lines of the first matrix converter and an ac line filter connected to the ac voltage lines of the second matrix converter.

32. A power converter according to claim 30, further comprising a first switching aid network (snubber) between the dc voltage lines of the first matrix converter, and a second switching aid network (snubber) between the dc voltage lines of the second matrix converter.

33. A power converter according to claim 32, wherein the first and second switching aid networks (snubbers) are of the capacitor resistor type.

34. A power converter according to claim 30, wherein the dc voltage lines of the first matrix converter and the dc voltage lines of the second matrix converter are connected to two common dc voltage lines, and further comprising a dc-link filter connected between the common dc voltage lines.

35. A power converter according to claim 30, further comprising means for selectively isolating the first and second matrix converters from each other.

36. A power converter according to claim 30, further comprising an inverter.

37. A power converter according to claim 36, wherein the inverter is a current source inverter.

38. A power converter according to claim 36, wherein the inverter is a voltage source inverter.

39. A method of power conversion using a matrix converter having three ac voltage lines, two dc voltage lines, a first switch connected between a first one of the three ac voltage lines and a first one of the two dc voltage lines, a second switch connected between a second one of the three ac voltage lines and the first one of the two dc voltage lines, a third switch connected between a third one of the three ac voltage lines and the first one of the two dc voltage lines, a fourth switch connected between the first one of the three ac voltage lines and a second one of the two dc voltage lines, a fifth switch connected between the second one of the three ac voltage lines and the second one of the two dc voltage lines, and a sixth switch connected between the third one of the three ac voltage lines and the second one of the two dc voltage lines, the first, second, third, fourth, fifth and sixth switches being controlled to open and close in a sequence using pulse width modulation such that each of the three ac voltage lines can be connected to one of the two dc voltage lines when one of the first, second, third, fourth, fifth and sixth switches is closed, and a freewheel path between the two dc voltage lines that includes a reverse-blocking device, the first, second, third, fourth, fifth and sixth switches being bi-directional, the method comprising the steps of:

using the matrix converter for motoring applications where a three-phase ac input voltage is supplied to the three ac voltage lines from a supply network and rectified by the matrix converter to provide a dc output voltage on the two dc voltage lines, and for generating applications where a dc input voltage is supplied to the two dc voltage lines and inverted by the matrix converter to provide an ac output voltage on the three ac voltage lines; and controlling the first, second, third, fourth, fifth and sixth switches using the pulse width modulation to connect the dc voltage lines to appropriate ac voltage lines or to none of the ac voltage lines during a motoring application with the dc voltage lines having a respective dc voltage polarity, and to connect the three ac voltage lines to appropriate dc voltage lines or to none of the dc voltage lines during a generating application with the dc voltage lines having the same respective dc voltage polarity such that the matrix converter is adapted to regulate bi-directional power flow while retaining a uni-directional dc voltage.

40. A method according to claim 39, wherein the reverse-blocking device is reverse biased when each of the three ac voltage lines is connected to one of the two dc voltage lines.

41. A method according to claim 40, further comprising the step of opening the first, second, third, fourth, fifth and sixth switches of the matrix converter so that dc current flows through the freewheel path and the reverse-blocking device is forward biased.

* * * * *